United States Patent [19]

Stiles

[11] 4,239,335

[45] * Dec. 16, 1980

[54] FIBER REINFORCED OPTICAL FIBER CABLE

[75] Inventor: Kenneth M. Stiles, San Dimas, Calif.

[73] Assignee: Sea-Log Corporation, Pasadena, Calif.

[ * ] Notice: The portion of the term of this patent subsequent to Sep. 12, 1995, has been disclaimed.

[21] Appl. No.: 937,138

[22] Filed: Aug. 28, 1978

Related U.S. Application Data

[63] Continuation of Ser. No. 600,202, Jul. 30, 1975, Pat. No. ;4,113,349.

[51] Int. Cl.³ .................................................. G02B 5/14
[52] U.S. Cl. ............................... 350/96.23; 350/96.30
[58] Field of Search ........................... 350/96.23, 96.33

[56] References Cited

U.S. PATENT DOCUMENTS

| | | | |
|---|---|---|---|
| 3,455,625 | 7/1969 | Brumley et al. | 350/96.22 |
| 3,691,001 | 9/1972 | Takahashi et al. | 350/96.23 |
| 3,865,466 | 2/1975 | Slaughter | 350/96.23 |
| 3,887,265 | 6/1975 | Margolis et al. | 350/96.23 |
| 3,980,390 | 9/1976 | Yamamoto et al. | 350/96.23 |
| 4,000,936 | 1/1977 | Gloge | 350/96.23 |
| 4,072,400 | 2/1978 | Claypoole et al. | 350/96.33 |
| 4,105,284 | 8/1978 | Olshansky | 350/96.33 |
| 4,114,981 | 9/1978 | Ishida et al. | 350/96.33 |

*Primary Examiner*—Stewart J. Levy
*Attorney, Agent, or Firm*—Christie, Parker & Hale

[57] ABSTRACT

A room temperature vulcanizable silicone rubber having a high coefficient of thermal expansion is provided at the interface between an optical fiber and a surrounding fiber reinforced resin shell in a cable construction. The surrounding rubber because of high coefficient thermal expansion shrinks more than the optical fiber or the resin shell during the manufacture operation. This relieves radial compressive loads on the optical fiber and prevents the distortion of the optical fiber by the surrounding fiber reinforced shell in manufacture and use. As a consequence, light transmission qualities are not impaired.

17 Claims, 3 Drawing Figures

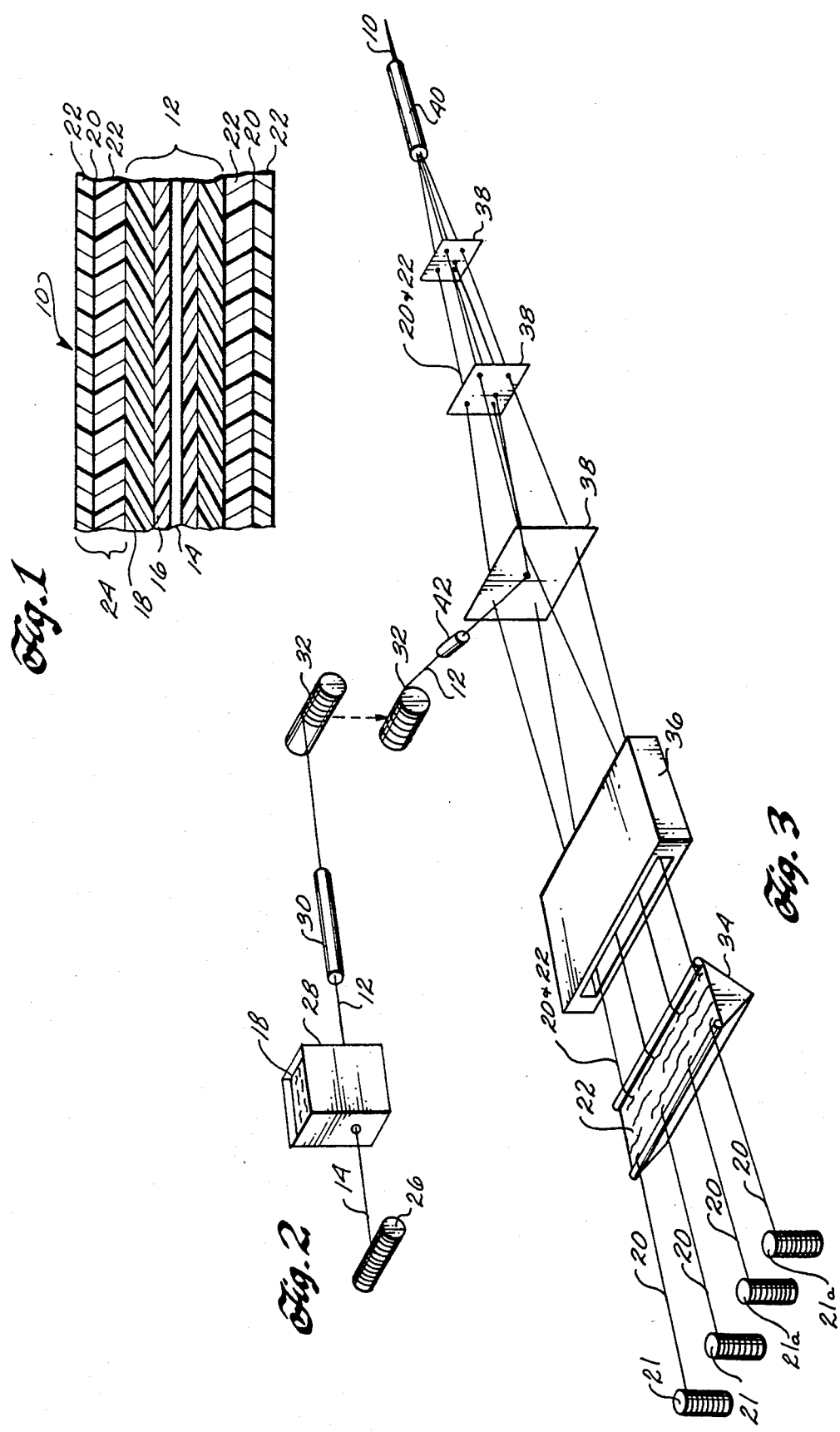

FIBER REINFORCED OPTICAL FIBER CABLE

CROSS REFERENCE TO RELATED APPLICATIONS

This is a continuation of application Ser. No. 600,202, filed July 30, 1975 now U.S. Pat. No. 4,113,349.

BACKGROUND OF THE INVENTION

Optical fibers among other utilities display the unique ability to rapidly transmit large quantities of information by light impulses. For the latter application, the optical fibers must be reinforced because of a need for continuous lengths of fibers between points of transmission and reception or amplification. The optical fibers must also be protected from abrasion, breakage and sharp bends, as well as tensile and compressive loads.

I have attempted to surround optical fiber monofilaments with strands of glass fibers or other high strength fibers, such as KEVLAR in a resin matrix to provide functional optical fiber cables of protracted length. Although the fibers remained unbroken, light transmission was terminated. This was attributed to distortion on the optical fiber due to stresses caused by the uneven shrinkage of the fiber reinforced resin matrix during cure.

SUMMARY OF THE INVENTION

According to the present invention, there is provided a fiber reinforced resin sheathed optical fiber cable and a process for its manufacture.

The optical fiber cable of this invention includes, as a central core, at least one optical fiber surrounded by an essentially annular coating of cured room temperature vulcanizable silicone rubber having a high coefficient of thermal expansion. The coating thickness is at least about 3 and preferably about 5 to about 10 mils. The presently preferred silicone rubber has a coefficient of thermal expansion of about $30 \times 10^{-5}$ in/in/° C. as measured by ASTM D-696, but may range from about $20 \times 10^{-5}$ to about $30 \times 10^{-5}$ in/in/° C. or more. A particularly preferred material is a room temperature vulcanizable silicone rubber having a Shore-A hardness of about 35.

Surrounding the cured silicone rubber coating is a fiber reinforced resin outer shell. The fiber reinforced resin outer shell contacts the silicone rubber, but is prevented by the silicone rubber from imposing, within a normal range of ambient temperatures, radial compressive loads on the optical fiber. This is achieved through setting of the resin while the cured silicone rubber is in a thermally expanded state. Although the resin employed may be a thermoplastic of suitable strength and hardness, it is more typically a thermoset resin. A variety of fibers may be used as the reinforcement. Glass fibers, high strength organic fibers such as a KEVLAR high modulus, aramid fibers, carbon metal fibers and boron fibers are preferred. Although a wide variety of fiber orientations may be used, fibers parallel to the axis of the cable are preferred for maximum tensile strength. Preferably, the reinforcing fibers are at least coextensive with the length of the optical fiber.

The optical fiber cables of this invention may be manufactured by the steps which comprise, first coating the optical fiber with the curable silicone rubber to a desired thickness, then curing the applied coating. The optical fiber may be primed prior to application of the coating, or coating applied directly to the fiber or polyvinylidene fluoride (KYNAR) or polyfluoroethylene (TEFLON) coating normally present on the optical fiber. Once the coating is cured and in a thermally expanded state, the reinforcing fibers and binding resin are applied. The resin of the combination is allowed to set or cure prior to final cooling of the coating to insure that all stresses on the fiber will be imposed and uniformly distributed by the thermally expanded cured silicone rubber coating. Upon cooling, the silicone rubber coating shrinks more than the fiber reinforced resin shell to eliminate essentially all compressive loads in the optical fiber core and possibly induce uniform radial tensile loads which aid in centrally suspending the cushioned optical fiber within the hardened outer shell.

During the process of manufacture of the cable, the thermally expanded silicone rubber coating on the optical fiber serves to prevent the surrounding fiber reinforced, resin matrix from imposing compressive, distorting pressures on the optical fiber. In addition, the relatively soft nature of the elastomeric rubber acts to absorb and distribute pressures which otherwise may be imposed upon the optical fiber during axial tensile loads which tend to stretch and, therefore, compress the surrounding fiber reinforced matrix. Further, during end use applications which require bending of the optical fiber, the silicone rubber coating prevents kinking which adversely effects or terminates light transmission.

THE DRAWINGS

FIG. 1 is a greatly enlarged cross-sectional view of the fiber reinforced optical cable of this invention.

FIG. 2 illustrates the method for preparing the optical fiber for use in the cable construction by application of the silicone rubber coating thereto.

FIG. 3 llustrates a method for the construction of the fiber reinforced optical cable of this invention using the silicone rubber coated optical fiber as prepared in accordance with FIG. 2.

DETAILED DESCRIPTION

According to the present invention, there is provided a unique optical fiber cable and a process for its manufacture.

As used in the specification and claims, the term "set" means a hardened non-fluid state as induced by solidifying a thermoplastic resin, or solidifying and curing, i.e. cross-linking of a thermosetting resin. By the term "thermally expanded state", there is meant the condition by which a silicone rubber coating has been or becomes expanded by its coefficient of thermal expansion to a thickness greater than the coating has at ambient or normal use temperatures.

With reference to FIG. 1, the optical cable 10 consists of an optical fiber core 12 illustrated as a single fiber, but can include a fiber bundle normally in a grouped or spaced parallel configuration, each fiber of which is at least coated with the silicone rubber. Each core 12 consists of optical fiber 14, normally coated with a polyvinylidene fluoride (KYNAR) or TEFLON coating 16 typically applied by the manufacturer and which is of typically irregular shape to protect the fiber. Surrounding coated or uncoated optical fiber 14 is an elastomeric coating 18 of a cured silicone rubber applied at a thickness of at least about 3 and preferably from about 5 to about 10 mils. The cured silicone rubber has a high coefficient of a thermal expansion ranging from about $20 \times 10^{-5}$ to about $30 \times 10^{-5}$ in/in/°C. or more as measured by ASTM D-696. The presently preferred silicone rubber has a Shore-A hardness (ASMD-785) of about 35 and a coefficient of thermal expansion of about $30 \times 10^{-5}$ in/in/°C.

Surrounding the elastomeric coating, is a matrix of a plurality of continuous reinforcing fibers 20 bonded by a resin 22 to form a fiber reinforced resin outer shell 24.

While the inner surface of surrounding shell 24 contacts the annular silicone rubber coating 18, because of the use of the high coefficient of thermal expansion of the coating during the process of manufacture, radial compressive loads on the optical fiber 12 are minimal if existent at all. More likely, as opposed to compressive forces, any forces which exist are radial tensile in nature due to the greater shrinkage of the silicone rubber coating following cable manufacture as compared to the optical fiber or the surrounding shell. Typically, the optical fiber 14 or its coating 16, as well as the shell 24, are bonded to some degree to the silicone rubber. Because of the condition of essentially no compressive loads on the optical fiber itself, with any minor loads being absorbed by the elastomeric silicone rubber, the optical fiber is distortion free even when sharply bent. Being free of even microscopic kinks, light transmission is uninterrupted. In sum, despite the closeness of the optical fiber to the tough fiber reinforced outer shell, the optical fiber is undisturbed and remains uncompressed and at its position to insure trouble free light transmission. This is due to the existence of the surrounding elastomeric buffer coating of silicone rubber of the high coefficient of thermal expansion.

The fibers used in the strengthening outer shell 24 may vary widely and include among other glass fibers; metal fibers, boron fibers, graphite fibers, high tensile strength organic fibers such as KEVLAR, an aramid fiber manufactured and sold by E. I. Du Pont de Nemour and Co., and the like. Each fiber strand 20 may be a monofilament or comprise a plurality of fibers to form an elongated strand. These are commonly known as "ends". The fibers in the strengthening core are preferably substantially parallel to the axis of the optical fiber but may be cross-spiral wound, crosswound or otherwise arranged along the length of the cable depending upon the desired end use properties for the cable.

Where, for instance, the cable need only sustain abrasive and compressive loads cross-spiral wound and other methods of arranging the reinforcing fibers around the core may be used. Where the cable is to be subjected to substantial tensile stresses, it is desired that the fibers be substantially parallel to one another and parallel to the optical fiber core. This insures the fibers will bear the primary load minimizing without imparting the tensile stresses either axially or radially to the optical fiber. To the extent forces exist, they are absorbed by and uniformly distributed along the silicone rubber coating.

The reinforced shell 24, as indicated, also contains a resin which binds the fibers and the protective silicone rubber.

The resins used in the outer shell, although preferably a thermosetting resin, may be thermoplastic, or thermosetting which will set (harden) or cure at an elevated temperature. This allows the resin of the outer shell to terminate the ability to flow while the silicone rubber is thermally expanded and at some temperature above the range of ambient temperatures to which the finished cable will normally be exposed.

Illustrative, but no wise limiting, of the thermosetting polymers which may be employed as a binding resin for the strengthening shell include curable epoxy resin such as those based on bisphenol "A" epichlorohydrin resins; phenol-formaldehyde resins; diallyl phthalate resins, melamine-formaldehyde resins, phenol-formaldehyde resins; phenol-furfural resins; urethane resins, polyesters and the like. The resin must, of course have the capacity to wet the fibers used in strengthening the outer core, and when cured form a surrounding shell having a coefficient of thermal expansion less than the coefficient of expansion of the silicone rubber coating on the optical fiber.

Useful thermoplastic resins, as indicated, are those which have relatively a high softening to allow setting of the shell while the silicone rubber coating is thermally expanded. Among the thermoplastic resins which may be used, there may be mentioned acrylonitrile styrene-butadiene, acetal homopolymers and copolymers, acrylics, alkyl resins, butadiene styrene, nylons, polysulfones, polycarbonates, polystyrene, vinyl resins and the like.

As with the thermosetting resins, the outer shell which includes the resin and fibers plus any fillers, colorants, etc., must have a coefficient of thermal expansion less than the cured silicone rubber. Preferably, the ratio of coefficient of expansion of the silicone rubber coating 18 to the outer shell 24 should be from about 30:1 to about 3:1.

In the net construction, the outer shell provides the abrasion resistance, impact resistance, rupture resistance, and tensile strengths, indigenous to the nature of materials selected for the construction of the outer shell and the manner of construction employed. This serves to protect the optical fiber while the cured silicone rubber coating on the fiber serves to protect the optical fiber from compressive pressures which would otherwise be imposed on the optical fiber by the process of cable manufacture or during use.

To minimize cable diameter, it is of course desired to compact to the extent possible the multitude of strengthening fibers and resin matrix, around the optical fiber. Normally the pressures induced on the optical fiber by the manufacturing process produces small but significant and somewhat randomly irregular compressive forces in the optical fiber. To that end, distortion of the optical fiber can result in an adverse effect on optical transmission, if not terminate transmission. Thus, the small kinks produced in manufacture of the cable which would be acceptable in the electrical cable are fatal to performance of the optical cable.

The use of the cured silicone rubber buffer coating on the optical fiber enables the production of continuous cable lengths of small diameter. Being thermally expanded during the process of cable manufacture, when the reinforcing fibers and resin matrix are applied and the resin set, the product cable is cooled. The silicone rubber contracts more than the encasing and optical fibers. This releases stresses on the optical fiber to insure no loss in light transmission qualities.

If anything, shrinkage can induce a radial tensile load within the silicone rubber coating which serves to more accurately suspend the optical fiber within the outer shell and which also serves as a buffer to account for loads induced in service. For instance, under tensile loads, the outer shell will tend to compress. To the extent radial tensile loads exist in the silicone rubber coating, they will be relaxed to prevent the loads from being transferred to the optical fiber. To the extent local loads may be applied to the fiber, they are absorbed by the elastomeric nature of the silicone rubber coating and distributed, thus reducing the possibility of localized loads of high pressure being applied to the optical fiber. To this end, the use of the elastomeric coating of high coefficient of thermal expansion has proved the key to successful manufacture of continuous lengths of optical cable of efficient light transmission qualities.

Cable diameter is controlled by the amount of reinforcement desired and the number of contained optical fibers. Where a number of continuous optical fibers are contained in a single outer shell, each is preferably coated with the cured silicone rubber elastomer. To identify each optical fiber strand, the coating on each fiber may be suitably color coded to enable proper connections to terminals at the end of the cable and cable repair when required.

As the optical fibers are normally individually coated, void space between fibers may be filled with the same or a different elastomeric material.

Maximum cable strength and minimum interference between optical fiber is preferably achieved by combining a multitude of continuous formed cables and binding the combination with the resin preferably reinforced with additional fiber lengths. In this instance, the cable shells or the buffer coating can be color coded.

FIGS. 2 and 3 illustrate one technique for manufacture of the optical fiber cables of this invention.

In the manufacturing process, the silicone rubber after application and curing, provides, by heating, a thermally expanded base upon which the fibers and the resin are applied. The thermally expanded coating protects the contained optical fiber from the pressures induced by cable shell manufacture by cushioning properties of the elastomeric coating. After resin set or cure, the combination is cooled and the elastomeric coating shrinks. Because of the higher thermal expansion of the elastomeric core, the shrinkage is much greater than the shrinkage of the surrounding shell. This releases the pressure induced from the matrix of the surrounding shell on the optical fiber through the cushioning coating and distributes residual forces, if any, to prevent localized kinks from forming.

The presently preferred method for manufacturing continuous lengths of coated optical fiber is illustrated in FIG. 2. With reference thereto, the continuous filament of optical fiber 14 alone or with a KYNAR coating 16 is provided first with the coating of the room temperature vulcanizable silicone rubber. This may be conveniently accomplished by feeding the optical fiber from a drum 26 through draw coater 28 where a uniform coat of silicone rubber is applied. Dies in the reservoir coater 28 containing the liquid elastomer 18 enables at a predetermined rate of feed, a uniform coating of the curable silicone elastomer to be applied to the surface of the optical fiber. A primer coat may be applied, if desired, ahead of coating with the silicone rubber. Also, a means such as a radioactive element (not shown) to discharge static electricity from the surface of the fiber may be employed to ensure proper alignment with the coating dies.

The optical fiber 14 and surrounding coat of the elastomeric layer form the coated fiber 12 which then passed through a curing zone 30 where cure is accelerated and, if desired, perfected. Room temperature cure can be employed if desired. Accelerated cure temperatures are in the range of about 150° to about 300° F. Catalysts used are those known in art for curing silicone rubber at ambient and elevated temperatures. The cured silicone rubber coated fiber is then wound on drum 32 for use subsequently in the manufacture of the cable or the coated filament passed directly to the cable manufacturing process.

With reference now to FIG. 3, which illustrates a cable manufacturing process, the reinforcing fibers 20 which form the part of the outer shell 24 may be fed from shells or drums 21 through an initial resin precoating system, such as dip well 34 and passed to a heated heat chamber 36. In the instance of the use of "B" and "C" stage thermosetting resins, the "B" stage is set in chamber 36 at known temperatures for the resin system selected.

The precoated fibers are then fed along with the cured silicone rubber coated optical fiber(s) through an array of aligning dies 38 which cause the resin coated fibers to be brought around the precoated silicone rubber optical fiber core in the desired end configuration. Once the desired end configuration is achieved, the combination, under tension, is passed through oven 40 when the combination is heated. The temperature to which the combination is raised is sufficient to enable thermal expansion of the elastomeric core, and to achieve bonding of the precoated fibers to each other. The completed cable 10 is then cooled to enable final shrinkage of the silicone rubber coating after setting of the resin in the surrounding cable.

In the instance where the resin is thermosetting, the temperature conditions reached in oven 40 are necessary to achieve final cure or cure of the "C" stage. For a typical "B" and "C" stage epoxy resin cure temperature is about 300° to about 400° F. Curing agents such as polyamids are typically employed. A functional resin system consists of 60% by weight of a bisphenol "A" epichlorohydrin epoxy resin and 40% by weight of a polyamide hardener.

In this instance, where the resin is thermoplastic, oven 40 is at a temperature sufficient to heat the resin above the melt temperature to enable completing wetting of and binding of the fibers and cured silicone rubber coating.

In the instance where the resin fuses are at a relatively low temperature, the silicone coated fiber may be preheated to a higher temperature in heater 42 to expand to a degree greater than that achieved in oven 40. In this instance, the coating will remain hot and in the expanded state while the outer surface of the cable shell sets to a diameter predetermined by the degree of expansion of the silicone rubber and amount added fibers and resin.

Although it is preferred to use a room temperature vulcanizable silicone rubber as the coating for the optical fibers, other elastomeric materials may also be used provided they have a coefficient of thermal expansion (ASTM D-696) greater than the optical fiber and resin cable.

It is also expedient instead of precoating fibers 20, to distribute over the cable formed by dies 38, powdered or liquid resin which flow as such or when heated above the melt temperature to flow between the reinforcing fibers and core, and become set after the silicone rubber coating is expanded in heated zone 40. Again, all that is required is that the coating be in a thermally expanded state when the resin of the outer shell sets to relieve pressures when the coating shrinks.

The procedure illustrated in FIG. 3 may also be used in the manufacture of a composite cable from a number of optical cables 10. In this instance, some or all of the spools 21 contain the optical cable 10 which are combined and resin coated in the manner illustrated to form a multi-optical fiber cable. Some of the spools can contain reinforcing fibers as fillers or strengtheners.

EXAMPLE 1

To prepare an optical cable in accordance with the invention, an optical fiber 5 mil in diameter having a coating of 0.5 mil of KYNAR was passed under a radioactive cell to discharge surface electricity then draw coated with a room temperature vulcanizable silicone rubber to a coating thickness of 7 mils. The coating applied is known as Dow Corning 93-072 RTV Silicone Rubber manufactured by Dow Corning Corporation. Cure followed using instruction provided in Bulletin 08-327 published by Dow Corning. Cure temperature was 280° F. The coated optical cable, 20 mil in diameter, was heated and surrounded with 48, 204 filament "S" glass fiber ends to form a cable 50 mil in diameter. The glass fiber ends paralleled the optical fiber. The binding resin was a heat cured epoxy. Cure temperature was 350° F. The cable after cure was cooled to room temperature and light transmission was uniform throughout its length.

EXAMPLE 2

Three continuous cables prepared in accordance with Example 1 were combined and void spaces filled with parallel ends of S glass and epoxy resin to form a composite cable of 115 mil diameter. Light was uniformly transmitted through all optical fibers of the composite cable.

What is claimed is:

1. An optical cable comprising:
   (a) an elongate optical fiber surrounded by a coating of an elastomer having a high coefficient of thermal expansion; and
   (b) an outer shell comprising a set resin surrounding the elastomer coating, the resin of the outer shell being set when said elastomer coating is in a thermally expanded state, said outer shell having a coefficient of thermal expansion less than the coefficient of thermal expansion of said elastomer coating and wherein the ratio of coefficients of thermal expansion of the elastomer coating to said outer shell is from about 3:1 to about 30:1, said outer shell being substantially constrained by said elastomer coating when in its thermally non-expanded state from imparting radial compressive forces on said optical fiber.

2. An optical cable as claimed in claim 1 in which the elastomer coating is bonded to said optical fiber and said outer shell.

3. An optical cable as claimed in claim 1 in which the elastomer coating has a coefficient of thermal expansion of from about $20 \times 10^{-5}$ to about $30 \times 10^{-5}$ in/in/°C.

4. An optical cable as claimed in claim 1 in which the elastomer coating has a thickness of at least about 3 mils.

5. An optical cable as claimed in claim 1 in which the elastomer coating has a thickness of from about 5 to about 10 mils.

6. An optical cable as claimed in claim 1 in which the resin is thermoplastic.

7. An optical fiber as claimed in claim 1 in which the resin is thermoset.

8. A coated optical as claimed in claim 1 in which the elastomer coating has a coefficient of thermal expansion of from about $20 \times 10^{-5}$ to about $30 \times 10^{-5}$ in/in/°C.

9. An optical fiber cable assembly comprising a plurality of optical fiber cable units bound by a resin, each cable unit formed of:
   (a) an elongate optical fiber surrounded by a coating of elastomer having a high coefficient of thermal expansion; and
   (b) an outer shell comprising a set resin surrounding the elastomer coating, the resin being set when said elastomer coating is in a thermally expanded state, said outer shell having a coefficient of thermal expansion less than the coefficient of thermal expansion of said elastomer coating and wherein the ratio of coefficients of thermal expansion of the elastomer coating to said outer shell is from about 3:1 to about 30:1, said outer shell being substantially constrained by said elastomer coating when in its thermally non-expanded state from imparting radial compressive forces on said optical fiber.

10. An optical cable as claimed in claim 9 in which the elastomer coating is bonded to said optical fiber and said outer shell.

11. An optical cable as claimed in claim 9 in which the elastomer coating has a coefficient of thermal expansion of from about $20 \times 10^{-5}$ to about $30 \times 10^{-5}$ in/in/°C.

12. An optical cable as claimed in claim 9 in which the elastomer coating has a thickness of at least about 3 mils.

13. An optical cable as claimed in claim 9 in which the elastomer coating has a thickness of from about 5 to about 10 mils.

14. An optical cable as claimed in claim 9 in which the resin is thermoplastic.

15. An optical fiber as claimed in claim 9 in which the resin is thermoset.

16. An optical cable comprising:
   (a) a core consisting of a plurality of elongate optical fibers wherein each optical fiber in the core is surrounded by a coating of elastomer having a high coefficient of thermal expansion, and wherein the exposed surface of the core is a portion of the provided elastomer; and
   (b) an outer shell comprising a set resin having a low coefficient of thermal expansion surrounding the core, the resin being of the outer shell set when said elastomer coating is in a thermally expanded state, said outer shell being substantially constrained by said elastomer coating at the surface of the core when in its thermally non-expanded state from imparting radial compressive forces on any contained optical fibers, the ratio of the coefficient of thermal expansion of the elastomer coating to the outer shell being from about 3:1 to about 30:1.

17. An optical fiber cable assembly comprising a plurality of optical fiber cable units bound by a resin, each cable unit formed of:
   (a) a core consisting of a plurality of elongate optical fibers wherein each optical fiber in the core is surrounded by a coating of an elastomer having a high coefficient of thermal expansion, and wherein the exposed surface of the core is a portion of the provided elastomer coating; and
   (b) an outer shell comprising a set resin having a low coefficient of thermal expansion surrounding the core, the resin being set when said elastomer coating is in a thermally expanded state, said outer shell being substantially constrained by said elastomer coating at the surface of the core when in its thermally non-expanded state from imparting radial compressive forces on any contained optical fiber, the ratio of the coefficient of thermal expansion of the elastomer to the outer shell being from about 3:1 to about 30:1.

* * * * *